United States Patent
Hsieh

(10) Patent No.: US 7,609,038 B2
(45) Date of Patent: Oct. 27, 2009

(54) SWITCHING POWER SUPPLY WITH PROTECTION FUNCTION

(75) Inventor: Ming-Chih Hsieh, Tu-Cheng, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 281 days.

(21) Appl. No.: 11/831,971

(22) Filed: Aug. 1, 2007

(65) Prior Publication Data
US 2008/0304297 A1   Dec. 11, 2008

(30) Foreign Application Priority Data
Jun. 7, 2007   (CN) .................... 2007 1 0200779

(51) Int. Cl.
*G05F 1/00*   (2006.01)
*H02H 7/10*   (2006.01)

(52) U.S. Cl. .................... 323/266; 323/286; 363/50

(58) Field of Classification Search .............. 323/241, 323/282–287, 228, 266, 271; 363/50, 56.01, 363/127, 173; 361/6, 18, 21; 332/109, 110
See application file for complete search history.

(56) References Cited

U.S. PATENT DOCUMENTS

| | | | |
|---|---|---|---|
| 6,304,465 B1 * | 10/2001 | Takita | 363/37 |
| 6,696,891 B2 | 2/2004 | Noro et al. | |
| 7,221,121 B2 * | 5/2007 | Skaug et al. | 318/807 |
| 2005/0231281 A1 * | 10/2005 | Taura et al. | 330/251 |

* cited by examiner

*Primary Examiner*—Jessica Han
*Assistant Examiner*—Emily Pham
(74) *Attorney, Agent, or Firm*—Frank R. Niranjan

(57) ABSTRACT

A switching power supply with protection function includes a transistor controlled to be on or off by a PWM signal from a PWM controller to convert a DC voltage into a square wave signal, a filter filtering the square wave signal into an output voltage signal, the output voltage signal being fed back to the PWM controller to be compared with a predetermined voltage, and a switch device having an input terminal for receiving the output voltage signal from the filter, an output terminal for connecting to a load, and a control terminal. If the voltage of the output voltage signal from the filter is not equal to the predetermined output voltage, the PWM controller will not output a signal to the control terminal of the switch device and the switch device will be in an off state. The PWM controller adjusts the duty ratio of the PWM signal until the voltage of the output voltage signal from the filter is equal to the predetermined output voltage such that the PWM controller outputs a control signal to turn on the switch device to allow the load receiving the output voltage signal via the switch device.

8 Claims, 1 Drawing Sheet

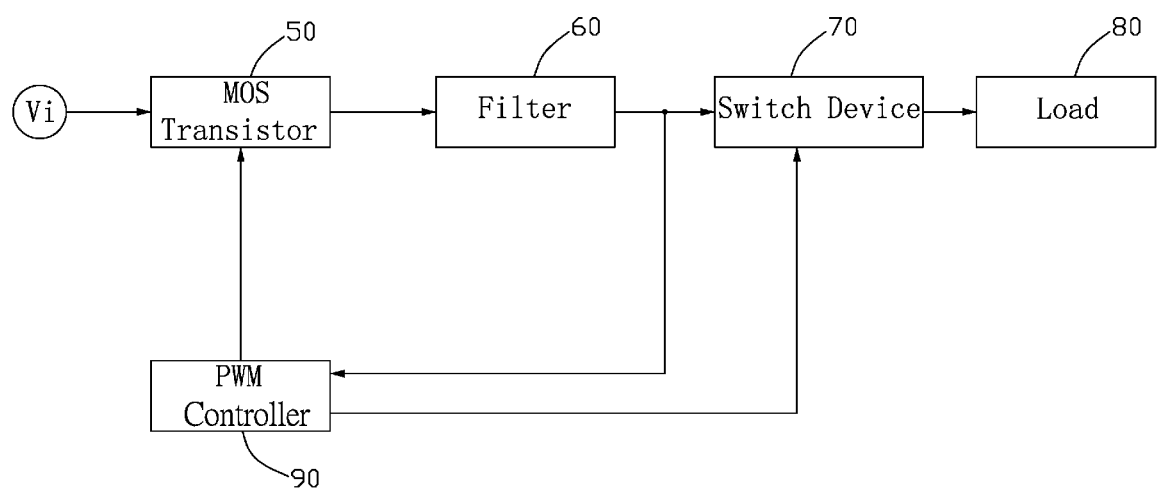

SWITCHING POWER SUPPLY WITH PROTECTION FUNCTION

BACKGROUND

1. Field of the Invention

The present invention relates to switching power supplies. In particular, the present invention relates to a switching power supply with a protection function, which can protect a load from damage.

2. Description of Related Art

Pulse width modulation (PWM) is traditionally used in a switching power supply to control output power and achieve regulation. Equipment such as mobile phones and computers use a PWM controller to supply power and charge batteries.

A conventional switching power supply uses a PWM controller to receive a feedback voltage, then adjust the duty ratio of a PWM signal to adjust the output voltage to a predetermined voltage. However, there is a brief period when the output voltage is unstable before it is adjusted to the predetermined voltage. If the unstable output voltage is directly provided to a load, such as a light emitting diode (LED), it can damage the load or decrease the useful lifetime of the load.

What is needed is a switching power supply system with a protection function that can protect a load from damage.

SUMMARY

An exemplary switching power supply with protection function includes a transistor controlled to be on or off by a PWM signal from a PWM controller to convert a DC voltage into a square wave signal, a filter filtering the square wave signal into an output voltage signal, the output voltage signal being fed back to the PWM controller to be compared with a predetermined voltage, and a switch device having an input terminal for receiving the output voltage signal from the filter, an output terminal for connecting to a load, and a control terminal. If the output voltage signal from the filter is not equal to the predetermined output voltage, the PWM controller will not output a signal to the control terminal of the switch device and the switch device will be in an off state. The PWM controller adjusts the duty ratio of the PWM signal until the voltage of the output voltage signal from the filter is equal to the predetermined output voltage such that the PWM controller outputs a control signal to turn on the switch device to allow the load receiving the output voltage signal via the switch device.

Other advantages and novel features of the present invention will become more apparent from the following detailed description of preferred embodiment when taken in conjunction with the accompanying drawings, in which:

BRIEF DESCRIPTION OF THE DRAWINGS

The drawing is a block diagram of a switching power supply with protection function according to an embodiment of the present invention.

DETAILED DESCRIPTION

Referring to the drawing, a switching power supply with protection function according to an embodiment of the present invention includes a transistor, a filter 60, a switch device 70, a load 80, and a PWM controller 90. In this embodiment, the transistor is a MOS transistor 50.

Each the MOS transistor 50 and the switch device 70 includes an input terminal, an output terminal, and a control terminal. In this embodiment, the switch device 70 is a MOS transistor. The input terminal of the MOS transistor 50 is connected to a DC power source Vi. The output terminal of the MOS transistor 50 is connected to the input terminal of the switch device 70 via the filter 60. In this embodiment, the filter 60 is an LC filter.

The PWM controller 90 includes a PWM signal output terminal, a feedback signal input terminal, and a control signal output terminal. The PWM signal output terminal of the PWM controller 90 is connected to the control terminal of the MOS transistor 50. The feedback signal input terminal of the PWM controller 90 is connected to a node between the filter 60 and the input terminal of the switch device 70. The control signal output terminal of the PWM controller 90 is connected to the control terminal of the switch device 70. The output terminal of the switch device 70 is connected to the load 80.

The DC power source Vi provides a DC input voltage to the MOS transistor 50. The PWM signal output terminal of the PWM controller 90 generates a PWM signal and outputs it to the control terminal of the MOS transistor 50. The MOS transistor 50 is turned on or off according to the PWM signal from the PWM controller 90, producing a square wave signal at the output terminal of the MOS transistor 50. The filter 60 filters the square wave signal and outputs an output voltage signal. The output voltage signal from the filter 60 is fed back to the PWM controller 90 to be compared with a predetermined output voltage.

If the voltage of the output voltage signal is not equal to the predetermined output voltage, the PWM controller 90 will not output a signal at the control signal output terminal thereof. Accordingly, the switch device 70 will be in an off state, and the output voltage signal from the filter 60 is not provided to the load 80. Meanwhile, the PWM controller 90 adjusts the duty ratio of the PWM signal until the voltage of the output voltage signal from the filter 60 is equal to the predetermined output voltage. At that time, the PWM controller 90 outputs a control signal to turn on the switch device 70, and the output voltage signal from the filter 60 is provided to the load 80 via the switch device 70.

The switching power supply with protection function employs the PWM controller 90 to turn on the switch device 70 after the voltage provided to the load 80 is stable, which protects the load 80 from damage because of unstable voltage.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching power supply with protection function, comprising:
   a transistor having an input terminal for receiving a direct current voltage, an output terminal, and a control terminal;
   a switch device having an input terminal, an output terminal for connecting to a load, and a control terminal;
   a pulse width modulation (PWM) controller having a PWM signal output terminal for outputting a PWM signal to the control terminal of the transistor to turn on or off the transistor so that a square wave signal is produced at the output terminal of the transistor, a feedback signal input terminal connected to the input terminal of the switch device, and a control signal output terminal connected to the control terminal of the switch device; and a filter connected between the output terminal of the transistor and the input terminal of the switch device for filtering the square wave signal from the transistor and outputting an output voltage signal to the input terminal of the switch device, the output voltage signal being fed back to the PWM controller to be compared with a predetermined output voltage;

when the voltage of the output voltage signal from the filter is not equal to the predetermined output voltage, the PWM controller does not output a signal at the control signal output terminal thereof and the switch device is in an off state, the PWM controller adjusts the duty ratio of the PWM signal until the voltage of the output voltage signal from the filter is equal to the predetermined output voltage such that the PWM controller outputs a control signal to turn on the switch device.

2. The switching power supply with protection function as described in claim 1, wherein the transistor is a MOS transistor.

3. The switching power supply with protection function as described in claim 1, wherein the switch device is a MOS transistor.

4. The switching power supply with protection function as described in claim 1, wherein the filter is an LC filter.

5. A switching power supply with protection function, comprising:

a transistor being controlled on or off by a pulse width modulation (PWM) signal from a PWM controller to convert a direct current voltage into a square wave signal;

a filter filtering the square wave signal into an output voltage signal, the output voltage signal being fed back to the PWM controller to be compared with a predetermined voltage; and a switch device having an input terminal for receiving the output voltage signal from the filter, an output terminal for connecting to a load, and a control terminal connected to the PWM controller;

when the output voltage signal from the filter is not equal to the predetermined output voltage, the PWM controller does not output a signal to the control terminal of the switch device and the switch device is in an off state, the PWM controller adjusts the duty ratio of the PWM signal until the voltage of the output voltage signal from the filter is equal to the predetermined output voltage such that the PWM controller outputs a control signal to turn on the switch device.

6. The switching power supply with protection function as described in claim 5, wherein the transistor is a MOS transistor.

7. The switching power supply with protection function as described in claim 5, wherein the switch device is a MOS transistor.

8. The switching power supply with protection function as described in claim 5, wherein the filter is an LC filter.

* * * * *